United States Patent
Ko

(10) Patent No.: US 7,024,626 B2
(45) Date of Patent: Apr. 4, 2006

(54) SYSTEM AND METHOD OF PRODUCING USER INTERFACE INFORMATION MESSAGES

(75) Inventor: Steve Ko, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 450 days.

(21) Appl. No.: 09/996,901

(22) Filed: Nov. 30, 2001

(65) Prior Publication Data

US 2003/0103072 A1 Jun. 5, 2003

(51) Int. Cl.
G09G 5/00 (2006.01)

(52) U.S. Cl. .................. 715/715; 715/714; 715/709; 715/708; 715/817

(58) Field of Classification Search ........ 345/705–711, 345/714, 715, 772, 762, 780, 805, 808, 809, 345/817, 826; 751/705–711; 715/714, 715, 715/772, 762, 780, 805, 808, 809, 817, 826, 715/705–711
See application file for complete search history.

(56) References Cited

U.S. PATENT DOCUMENTS

| | | | |
|---|---|---|---|
| 4,648,062 A | | 3/1987 | Johnson et al. |
| 5,287,448 A | | 2/1994 | Nicol et al. |
| 5,428,731 A | | 6/1995 | Powers, III |
| 5,428,733 A | | 6/1995 | Carr |
| 5,434,965 A | | 7/1995 | Matheny et al. |
| 5,469,540 A | | 11/1995 | Powers, III et al. |
| 5,481,667 A | | 1/1996 | Bieniek et al. |
| 5,544,305 A | | 8/1996 | Ohmaye et al. |
| 5,546,521 A | * | 8/1996 | Martinez ............... 715/711 |
| 5,793,952 A | * | 8/1998 | Limsico ................ 713/202 |
| 6,020,886 A | * | 2/2000 | Jacober et al. ......... 345/709 |
| 6,034,687 A | * | 3/2000 | Taylor et al. ........... 715/775 |
| 6,232,971 B1 | * | 5/2001 | Haynes ................. 345/800 |
| 6,424,995 B1 | * | 7/2002 | Shuman ................ 709/206 |
| 6,717,589 B1 | * | 4/2004 | Grillo et al. ........... 345/715 |
| 2002/0051017 A1 | * | 5/2002 | Wishoff ................ 345/774 |
| 2003/0011639 A1 | * | 1/2003 | Webb .................... 345/808 |
| 2003/0020756 A1 | * | 1/2003 | Bates et al. ........... 345/788 |

FOREIGN PATENT DOCUMENTS

| WO | WO 01/44916 | * | 6/2001 |
|---|---|---|---|
| WO | WO 01/44918 | * | 6/2001 |

OTHER PUBLICATIONS

IBM Technical Disclosure Bulletin, "Validation Field Control for Handling Error Messages," vol. No. 40, Issue No. 11, p. No. 167-168, publication date Nov. 1, 1997.*

* cited by examiner

*Primary Examiner*—Tadesse Hailu
(74) *Attorney, Agent, or Firm*—Buchanan Ingersoll PC

(57) ABSTRACT

A system and method for producing notification objects conveying computer warning or error notification information to a computer user is provided. The notification objects point to a target to which the information contained therein relates and are persistent until dismissed by a user or an application. The notification objects are aware of the bounds of their target, and where possible do not obscure any part of their target. These objects are collapsible, allowing the user to minimize the objects, and are also non-modal, allowing a user to fully interact with any running application while the notification objects are visible. These notification objects are only visible when the window containing the target to which the information in the notification object relates is the active window.

30 Claims, 4 Drawing Sheets

SYSTEM AND METHOD OF PRODUCING USER INTERFACE INFORMATION MESSAGES

FIELD OF THE INVENTION

The present invention relates generally to graphical user interfaces (GUIs) that are associated with computer operating systems. More specifically, the present invention relates to the display of information messages, such as warnings or error messages, associated with various elements within a GUI.

BACKGROUND OF THE INVENTION

One of the most prominent aspects of interfacing with modern computer operating systems is the graphical user interface (GUI). A user employs a GUI to perform various operations supported by the computer operating system and to graphically interact with the operating system and application programs. Interaction with the computer by way of a GUI may include, for example, opening and closing windows, entering information into forms, selecting commands from a pop-up or pull-down menu, activating check boxes or radio buttons, or otherwise generally manipulating elements of the computer's GUI.

In the course of interfacing with the GUI, a user may perform invalid functions, enter invalid information that is not discernable by the operating system or an active application, or otherwise cause computer errors. In such situations, the GUI must notify the user of the error by reporting a warning to the user regarding any invalid information which has been entered. Generally this occurs by way of a system error message or other similar error message. Frequently, when such error messages are displayed to a user, they have a limiting effect on the user's ability to interact with the computer. For example, it is common when an error message is being displayed that the user is unable to access any other computer applications until the error message is dismissed or the problem causing that error has been fixed. This type of error notification is generally referred to as a system modal notification because no resources of the entire system are available until it is dismissed. Such error messages often are placed in front of other windows running applications in the GUI and do not allow the user to view these windows while the error message is being displayed.

The fact that a user is unable to access other applications during the time in which error messages are being displayed may be particularly troublesome for time-sensitive applications. Should the user wish to view other applications being executed on the computer, it is necessary to first dismiss the warning message before interaction with the other applications can resume.

In addition to system modal events, which lock up the resources of the entire system, other modalities exist as well. For example, some error notification objects are application modal, meaning that no resources associated with the application to which the notification object is related may be used until the notification is dismissed; however, other applications may be used without dismissing an application modal notification. A window modal object is attached to a specific window, and prevents resources of a specific window from being used until it is dismissed. However, with a window modal object, a user may switch between windows and interact with other windows, as only the window that is related to the window modal object has its resources locked until dismissal of the object.

These other types of modal objects (i.e., application modal objects and window modal objects) may also cause problems for a user of the computer. For example, if an error notification is either application modal or window modal, it is possible that the notification object itself may obscure information required by the user prior to dismissal of the notification object. Additionally, a modal notification object of any kind may contain information required by the user after dismissal of the notification object. In such a case, the user would be required to remember or record the information contained within the notification object for use after the object has been dismissed.

Accordingly, it is desirable to provide a system and method of notifying a user of computer warnings and errors that obviate the problems discussed above. Specifically, it is desirable to provide a system and method for notifying a user of computer warnings and errors by providing information about warnings and errors in a manner such that the user may freely use other applications and windows, and access other processes of the computer operating system without requiring that the user first address the error or dismiss a warning message. It is further desirable that objects containing information regarding computer warnings and errors be presented in such a fashion that a user may readily access other portions of the GUI by using collapsible, non-obscuring notification objects.

SUMMARY OF THE INVENTION

Accordingly, the present invention provides dynamic user interface reporting of computer warnings and errors. This is accomplished by way of notification objects that relay information to a user regarding errors, warnings, and the like. Each notification object is associated with a target, or particular portion of an application's active window, such as a data entry field, or the like.

These notification objects have various characteristics that are advantageous in accomplishing the objectives of the present invention. For example, the notification objects point to a target object, indicating the specific element to which the computer warning, or error message, contained within the notification object is related. These notification objects are persistent, and are maintained until dismissed by the application, which, in some cases, is only after intervention by a user. Additionally, to allow a user the convenience of interacting with and viewing other parts of the GUI, the notification objects are collapsible, which allows them to be shrunk to a miniature size. The notification object is non-obscuring, which means it is aware of the bounds of its target and does not obscure information contained within any part of its target whenever possible. Further, the notification objects are non-modal, so that a user can fully interact with the active application, or other applications before the notification object containing the warning or error messages has been dismissed, or even while it remains visible.

Further features of the invention, and the advantages offered thereby, are explained in greater detail hereinafter with reference to the specific embodiments illustrated in the accompanying drawings, wherein like elements have been designated by like numerals.

DETAILED DESCRIPTION OF THE PREFERRED EMBODIMENTS

To facilitate an understanding of the principles of the present invention, it is explained hereinafter with reference to its implementation in an illustrative embodiment. In particular, the invention is described in the context of a system and method for conveying computer system information messages to a user by way of graphical notification objects contained within a computer operating system's graphical user interface (GUI). The drawings illustrate embodiments of the present invention within the context of the Macintosh® operating system (Mac OS) developed by Apple Computer, Inc. It will be appreciated, however, that these drawings do not represent the only embodiments in which the present invention can be implemented. Rather, it can find utility in a variety of computer configurations, as will become apparent from an understanding of the principles upon which the invention is based.

Figure 1:
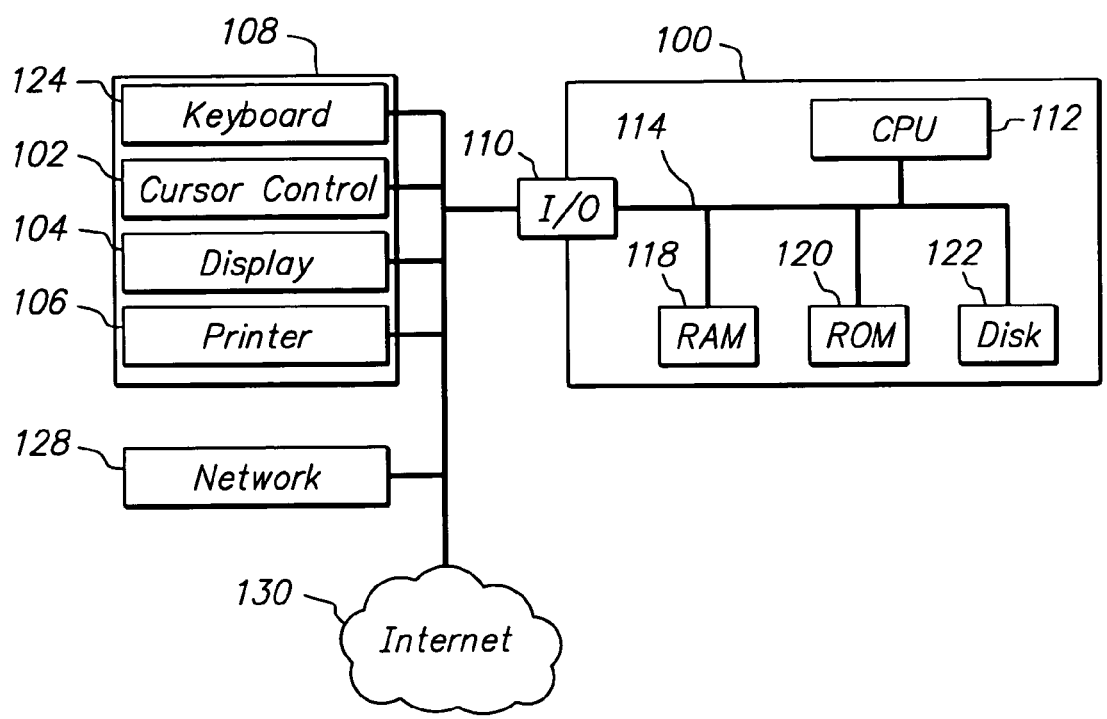
FIG. 1 is a block diagram of an exemplary computer system in which the system and method of the present invention can be employed.

An exemplary computer system of a type in which the present invention can be employed is illustrated in block diagram form in FIG. 1. Referring to FIG. 1, a computer 100 has a variety of peripheral devices 108 connected thereto. The computer 100 includes a central processing unit (CPU) 112, a main memory which is typically implemented in the form of a random access memory (RAM) 118, a static memory that can comprise a read-only memory (ROM) 120, and a permanent storage device, such as a magnetic or optical disk 122. The CPU 112 communicates with each of these forms of memory through an internal bus 114. The peripheral devices 108 include a data entry device such as a keyboard 124, and a pointing or cursor control device 102 such as a mouse, trackball, or the like. A display device 104, such as a CRT monitor or an LCD screen, provides a visual display of the information that is being processed within the computer, by means of the operating system's GUI. A hard copy of this information can be provided through a printer 106, or similar device. Each of these extra peripheral devices communicates with the CPU 112 by means of one or more input/output ports 110 on the computer. The input/output ports 110 also allow the computer 100 to interact with a local area network server or an external network 128, such as a LAN or WAN, or the Internet 130.

The computer 100 typically includes an operating system (OS), which controls the allocation and usage of hardware resources such as memory, central processing unit time, disk space, and peripheral devices. In addition, the operating system conveys warnings or information messages regarding computer errors that may affect the user's interaction with the computer.

Figure 2:
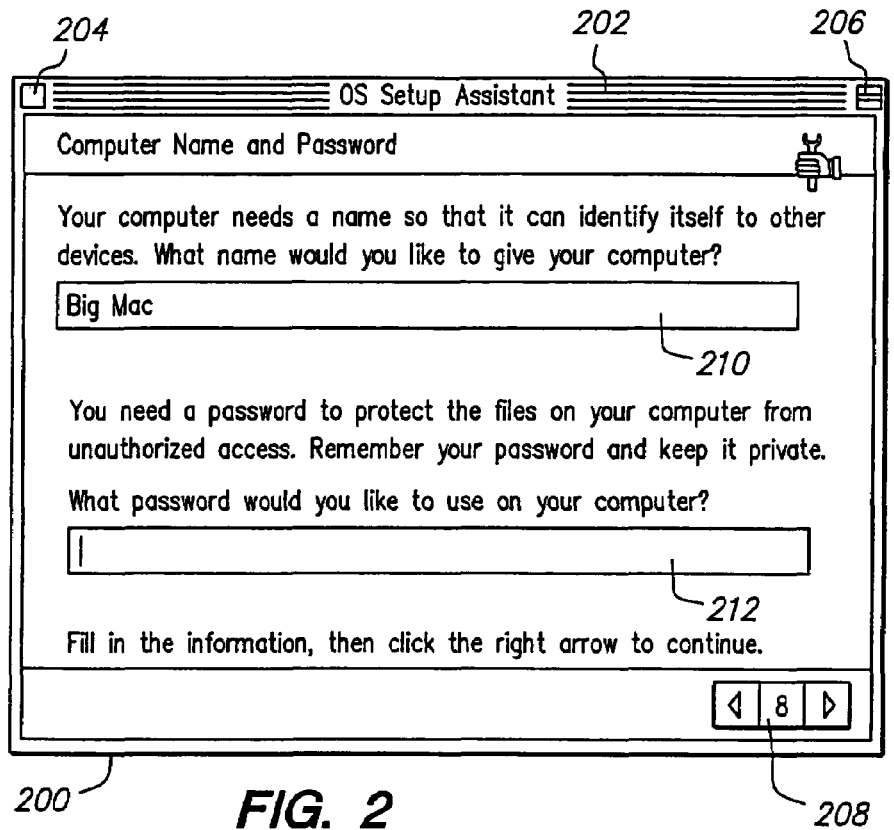
FIG. 2 is a diagram of a data entry window associated with an embodiment of the present invention.

Typically, a graphical user interface employs various types of windows to display information to users. FIG. 2 illustrates an exemplary window 200 in which the features of the present invention can be employed. The window 200 has standard elements, such as the title bar 202, which contains the title of the window along with various control buttons, such as a close window box 204 and a window shade scroll box 206. The types and location of these control buttons may vary according to design choices. Additionally, navigational controls 208 are provided which contain a forward and back arrow, and an indication of the present page number displayed within the window for the convenience of navigating through pages of information displayed within the window 200.

The exemplary window 200, illustrated in FIG. 2, is associated with a Setup Assistant for customizing the computer's operating system (OS). The page of information displayed in the window 200 (i.e., page 8) allows a user to enter a name to identify the computer and a password by which the computer may be accessed. Two data entry fields 210, 212 are provided for the entry of a computer name and password, respectively. Once this information has been entered, the user proceeds with the operating system setup procedure by clicking on the right arrow contained within the controls 208 to advance to the next page of the setup information (i.e., to page 9). If, however, the user neglects to enter text in one of the data entry fields 210, 212 when text is required in these fields, and attempts to advance to the subsequent setup page, an error message is generated.

Figure 2A:
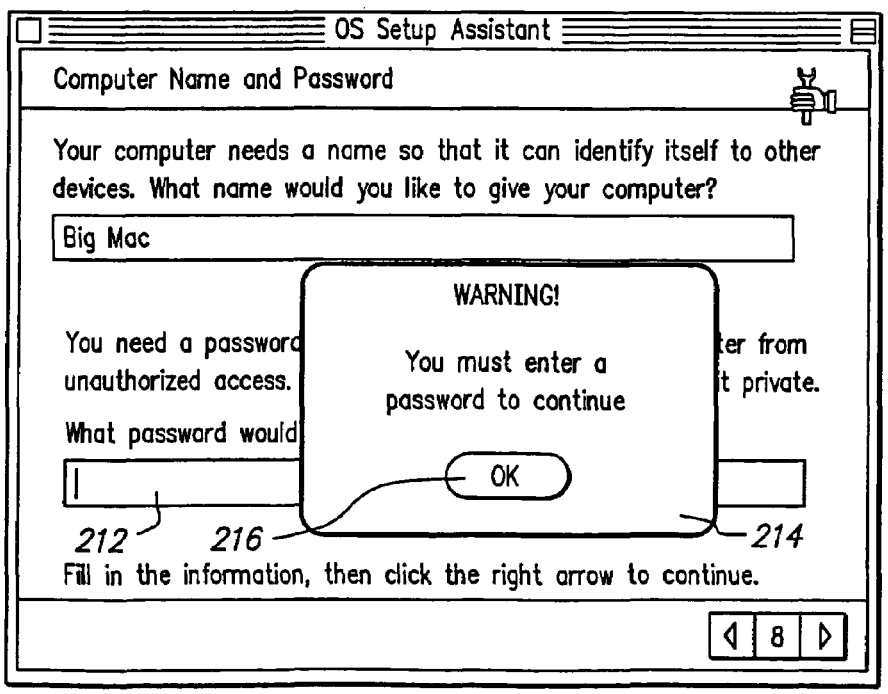
FIG. 2A is an illustration of a conventional warning message.

In the past, messages from the operating system or an application program informing the user of such errors were obtrusive and often obscured the user's view of the window containing the error, or rendered all applications currently in use inaccessible until the message was dismissed through user intervention. An example of such an error message window 214 is illustrated in FIG. 2A. As can be seen, it obscures a large portion of the text entry field 212 in which the missing data needs to be inserted. To remove the window and correct the omission, the user is forced to click on a button 216. This approach, however, is undesirable as these types of windows are generally modal, and therefore prevent interaction with the window or application with which they are associated, or with the operating system, until dismissed.

Figure 3:
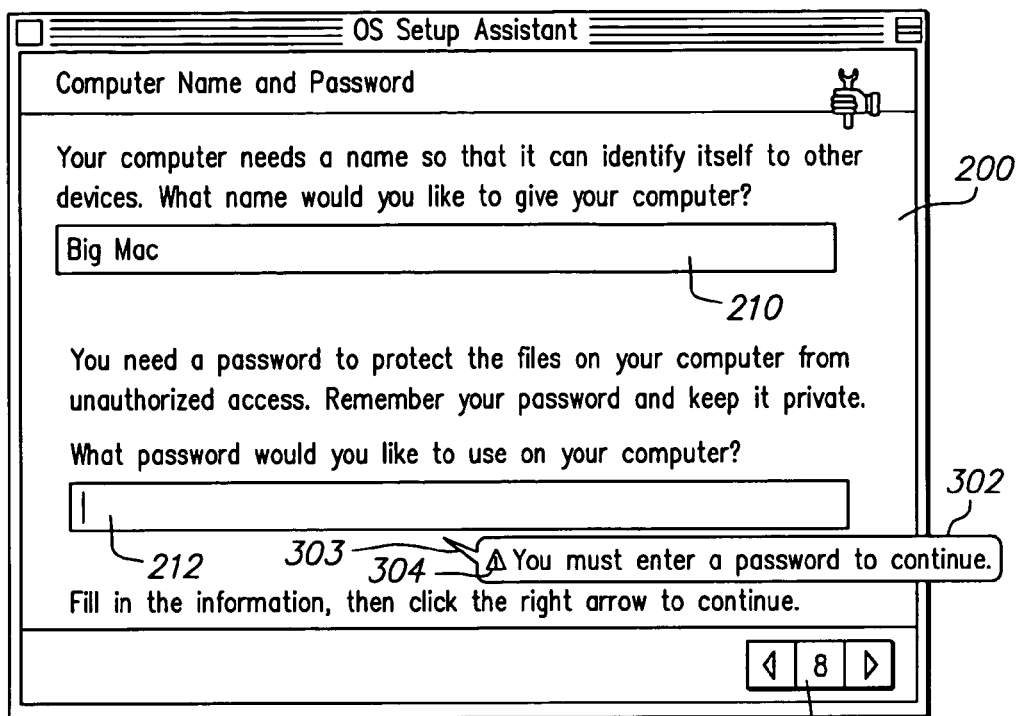
FIG. 3 is a diagram of a window used in a computer operating system GUI, associated with an embodiment of the present invention.

FIG. 3 illustrates a window in which an error message is displayed to a computer user in accordance with an embodiment of the present invention. In FIG. 3, the window 200 is illustrated after a user has clicked on the right arrow of controls 208 without entering a password. The program which generates the data entry window 200, in this case the computer operating system, recognizes that an entry is required in the empty data entry field 212 when the user clicks on the right control arrow of the navigational controls 208. In response, the operating system generates an error message, which is displayed in a notification object 302. The notification object 302 contains a text message relaying instructions to the user regarding an error condition that has been detected. Also contained within the notification object 302 is an icon 304 indicating the general nature of the message being displayed within the notification object 302. In the case illustrated in FIG. 3, the icon 304 is a warning icon, which indicates that the text message contained within the object 302 relates to a user error. The icon 304 may be a variety of different icons indicating different types of information being relayed by the notification object 302.

The notification object 302 could take the form of a speech bubble having a cartouche 303, as illustrated in FIG. 3, for example. This cartouche is shaped such that it points to the data entry field 212 to which the error message pertains. It will be recognized by those skilled in the art that the shape of the notification object 302 may be varied, and a speech bubble is merely one example of a shape which this notification object may take. As those skilled in the art will recognize, to draw the user's attention to the notification object 302 at the time of its display, an animation sequence may be used to render the notification object. Additionally, an audible indicator such as a beep, musical tone, or the like, may be used to signal the appearance of the warning or other message contained within the notification object.

A notification object of the type illustrated in FIG. 3 has multiple advantageous properties. First, the notification object points to the target to which the information contained therein refers. In the case illustrated in FIG. 3, the notification object 302, or more particularly the cartouche 303, points to the data entry field 212, which requires the entry of a password, as indicated by the text contained in the notification object 302. This allows a user to immediately ascertain the source of any error, cause of any warning and/or subject of any message contained within the notification object 302. According to a preferred embodiment of the present invention, the notification object 302 maintains its position relative to its target, which in this case is the data entry field 212, even when the target is moved. For example, in the case illustrated in FIG. 3, if the window 200 containing the data entry field 212 is moved, the notification object 302 is moved in a corresponding manner to maintain its position relative to its target, the data entry field 212. The position of the object 302 is anchored to that of the target field 212, so that the cartouche continues to point to its target. For instance, the x and y position parameters which determine the location of the object 302 could be specified relative to a reference point on the data entry field 212 (e.g., its upper left corner, etc.).

According to another aspect of the present invention, the notification object 302 remains present until it is dismissed by the application that generated the warning message. In the case illustrated in FIG. 3, the notification object would be dismissed by the OS Setup Assistant application when the user enters the password required in the data entry field 212, or when the user clicks on the forward arrow of the controls 208 after entering this information. The notification object 302 is non-obscuring in that the operating system knows the bounds of the notification object's target, and draws the notification object such that it does not obscure any part of a target, if possible, so that the user can readily enter and/or edit the required data in the field. Additionally, in accordance with an embodiment of the present invention, the notification object 302 is non-modal, meaning that a user can still fully interact with the application being referenced by the notification object 302 or other applications, even when the warning or error displayed in the notification object 302 is being displayed. In the case illustrated in FIG. 3, this means the user may still interact with the OS Setup Assistant application and may enter data into the data entry fields, change data already entered therein, and/or adjust window size or location, and so forth, even while the warning message is being displayed in the notification object 302.

Figure 4:
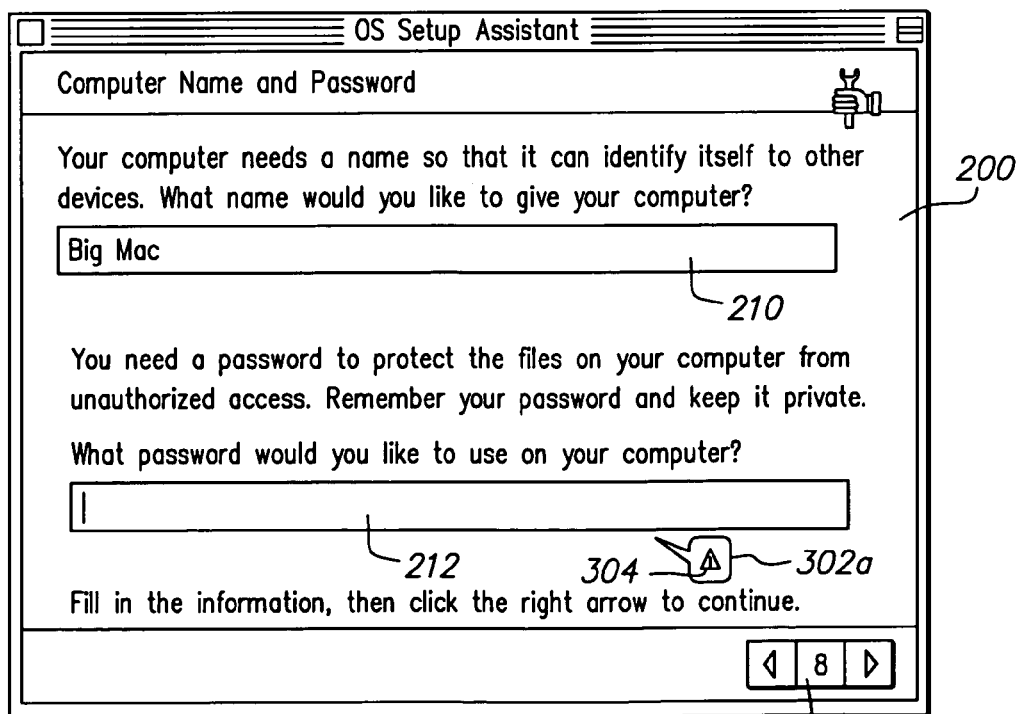
FIG. 4 is a diagram of a window used in a computer operating system GUI, associated with an embodiment of the present invention.

FIG. 4 illustrates another feature of the present invention. In FIG. 4, the notification object has been collapsed to a miniaturized version 302a of the notification object 302 illustrated in FIG. 3. The notification object may be collapsed by way of a user command or action. For example, according to an embodiment of the present invention this is accomplished by clicking on the icon 304, which remains visible in the collapsed form of the notification object 302. In this manner, although the notification object 302 is persistent, and remains until dismissed by the application (in this case, after correction of the related error condition by way of entry of a password into data entry field 212), the user may reduce the size of the notification object in order to view more information contained within the window 200. Additionally, the notification object 302 can be restored to its initial size and position when the user again clicks on the information icon 304.

It should be recognized by those skilled in the art that the notification object 302 could be configured such that the user may reposition it (e.g., by a click-and-drag technique), while the cartouche remains pointing to its target and the notification object 302 remains non-obscuring to the target, and the surrounding text. In this manner, the user may have the added convenience of repositioning the notification object, such that any information contained within the window 200 beneath the initial location of the notification object 302 may be viewed. Those skilled in the art will recognize that numerous user actions or commands can be employed to collapse and/or reposition the notification object 302, without departing from the spirit of the present invention, such as, for example, mouse events, keyboard commands, and the like.

Once the data required by the notification object 302 has been entered into data entry field 212 thereby correcting the error condition, the related error message and notification object are dismissed. According to an embodiment of the present invention, the notification object 302 is visible only when the window containing the target to which it relates is active, or is the front-most window within the operating system's GUI. More particularly, since the notification object 302 is non-modal, it is possible for the user to access other windows displayed by the GUI (e.g., windows associated with either another application or with the OS Setup Assistant). When another window is accessed, the window containing the target of the notification object is moved behind that window. When this occurs, all of the warnings, or notification objects, associated with that window become temporarily invisible. Any notification objects which become invisible in such a manner are again made visible when the window containing the target becomes active, or is moved to the front-most position within the operating system's GUI. This may occur, for example, as a user activates one of multiple windows within a single application, or as a user brings applications to the GUI's foreground while sending other applications (along with their windows) to the GUI's background.

Figure 5:
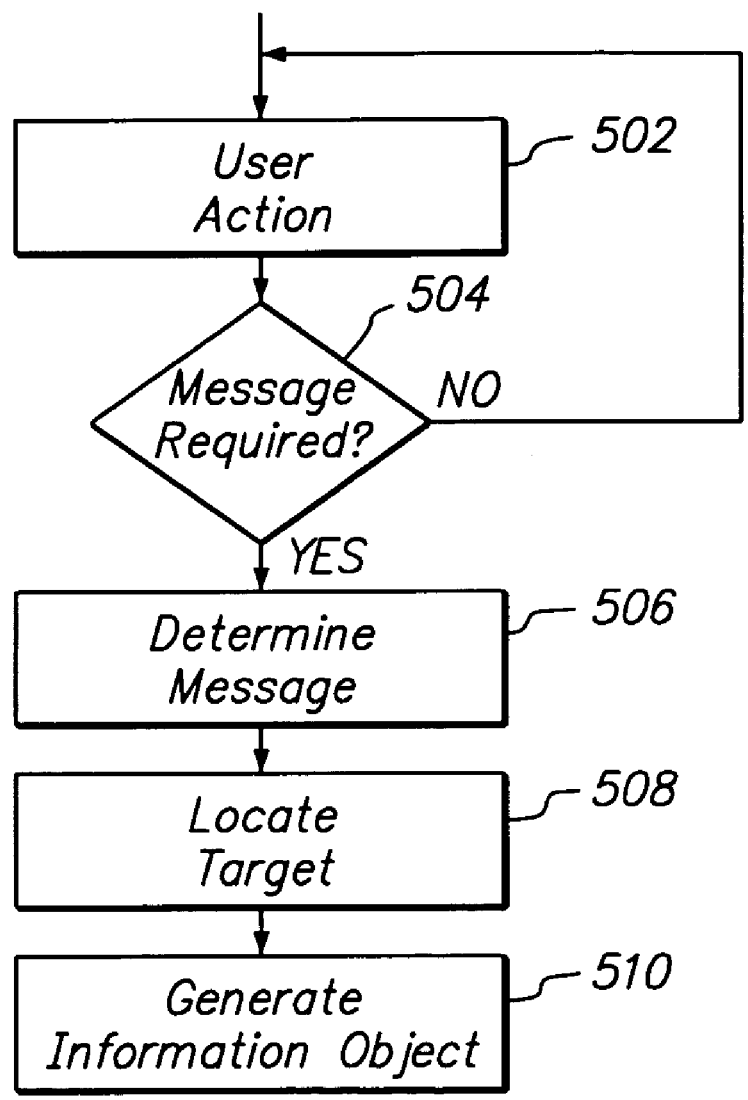
FIG. 5 is a flow diagram illustrating the steps associated with the method of the present invention according to an exemplary embodiment.

FIG. 5 is a flow diagram illustrating the method associated with an embodiment of the present invention. In the flow diagram illustrated in FIG. 5, a user action is executed at step 502 whereupon a decision is made in step 504 whether or not a message must be generated corresponding to the action taken by the user in step 502. The user action taken in step 502 may be, for example, a user clicking an on-screen button to submit information, or other similar actions. Those skilled in the art will appreciate that the determination made in step 504 may be made according to any error condition generated by the operating system, or other applications.

If at step 504 it is determined that a message is not required, then the operating system continues normal processing until the next user action is taken. If, on the other hand, a message is required corresponding to the user action taken at step 502, an appropriate message is determined at step 506. This message determined at step 506 may be part of a pre-determined message related to an error condition by which the determination at step 504 was made. After the message to be generated in association with the user action at step 502 has been determined, the application responsible for generating the message determines the target of the message at step 508. The target location and size may be determined at step 508 by an application program interface (API), which may indicate a region, such as a rectangle that identifies the target, so that the message to be generated within a notification object may be generated in such a manner that it does not obscure the target. After determining the target in step 508, a notification object is generated at step 510. This notification object is then displayed, as described above, so that it points to or otherwise identifies the target that was determined in step 508.

The notification objects described herein may also be used in connection with various other objects, such as user input elements contained within window. For example, text fields, check boxes, radio buttons, and/or pop-up menus may be the target of notification objects, which may be triggered by a user action of entering or editing data in such elements or submitting data associated with these elements in another manner, such as clicking on a control arrow, or a "Submit" button. The step 504 of determining whether or not a message is required in FIG. 5, may comprise validating information submitted by a user, and detecting if either invalid or incomplete data has been submitted, or if required data is missing. The example described in connection with FIGS. 2, 3 and 4 uses the notification object 302 to indicate that a password must be submitted in page 8 of the OS Setup Assistant; however, other types of warning information may be displayed within such a notification object. For example, a notification object containing information regarding an e-mail client may display a warning when a user tries to send an e-mail message that has not been addressed. In such a case, a notification object similar to the notification object 302 illustrated in FIG. 3 could be displayed with text indicating that the user must enter an address in the address field.

From the foregoing, it can be seen that the present invention provides a system and method for conveying notifications, warnings, and error messages to users by way of the operating system's graphical user interface (GUI). The notification object contains a warning or error notification message, and points to the target with which the message contained therein is associated. The notification object is persistent, and is only dismissed by the application after correction of the action that generated the warning or error notification message in the first place. This may be, for example, when a user submits valid data, which was previously invalid, incomplete, or missing.

The notification objects of the present invention are collapsible, and allow for minimizing the notification object containing the error or warning by clicking on an icon or executing another user command or action. The system and method of the present invention also provide that the notification object is non-obscuring, and is aware of the bounds of its target, thereby avoiding obscuring any part of the target.

Additionally, the system and method of the present invention provide non-modal computer notification objects, which allow the user to fully interact with an application while the warning or error notification message is visible. Also, a message contained in notification object and the notification object itself are only visible when the window containing the target with which the information contained in the notification object is associated is active, or front-most. The notification objects associated with the present invention may be rendered in a manner such that they draw the attention of the user, which may include, for example, animating the appearance of such a notification object or providing accompanying audio indicators.

It will be appreciated by those of ordinary skill in the art that the present invention can be embodied in other specific forms without departing from the spirit or essential characteristics thereof. For example, the invention has been described in the context of a notification object relaying warning or error notification messages in the form of a speech bubble with a cartouche that points to a target of the information contained within the notification object. However, it will be recognized by those skilled in the art that the shape, or particular design characteristics of the notification object are not critical to the operation of the present invention, and may be varied according to the design choice of designers and computer programmers using such a notification object. Additionally, the type of animation or audio indication presented at the appearance of such notification objects or associated with their motion (e.g., collapsing, etc.) may be varied depending on various design choices, according to the characteristics desired to be presented to the computer user.

The presently disclosed embodiments are, therefore, considered to be in all respects to be illustrative and not restrictive. The scope of the invention is indicated by the appended claims, rather than the foregoing description, and all changes that come within the meaning and range of the equivalents thereof are intended to be embraced therein.

What is claimed is:

1. A method for notifying a computer user of a computer information message, comprising the steps of:
   determining if a condition associated with a received action requires generation of an information message;
   selecting an information message to be generated corresponding to said condition;
   identifying a target object associated with the action performed by the user, to which the information contained within the notification message relates;
   displaying a notification object in a first state, which indicates the target object, contains said information message corresponding to said condition and maintains its position relative to the target object even if the target object is moved, in a persistent manner until dismissed by a user while enabling the user to continue interaction with an application program corresponding to said target object; and
   selectively displaying said notification object in a second, collapsed state having a reduced size relative to said first state.

2. The method of claim 1, wherein said notification object comprises a warning.

3. The method of claim 1, wherein said notification object comprises an error message.

4. The method of claim 1, wherein said notification object comprises a notification.

5. The method of claim 1, wherein said notification object includes a cartouche which points to the target object.

6. The method of claim 1, wherein said step of displaying includes providing a video animation sequence.

7. The method of claim 1, wherein said step of displaying includes generating an audio indicator.

8. The method of claim 1, wherein said notification object is displayed in said collapsed state in respect to a mouse event.

9. The method of claim 8, wherein said notification object contains an icon, and is displayed in said collapsed state in response to a mouse click on the icon.

10. The method of claim 1, wherein said notification object is displayed in said collapsed state in response to a keyboard command.

11. The method of claim 1, wherein said notification object is persistent and remains displayed until said condition is removed.

12. The method of claim 1, wherein said notification object is displaced from said target object so that it does not obscure said target object.

13. The method of claim 1, wherein said notification object enables a user to interact with application programs other than the application program corresponding to said target object, while said notification object is being displayed.

14. The method of claim 1, further comprising the steps of:
hiding the notification object when an application associated with said target object is inactive; and
displaying the notification object when an application associated with said target object is active.

15. The method of claim 1, wherein the notification object maintains its position relative to the target object in both its first and second states.

16. A system for notifying a computer user of a computer information message, comprising:
means for receiving an action performed on a computer by a user;
means for determining if the received action requires generation of a computer information message;
means for selecting a computer information message to be generated corresponding to said action performed by the user;
means for locating a target object corresponding to the action performed by the user, to which the information contained within the notification messages relates;
means for displaying a persistent, non-modal, notification object in a first state which indicates the target object, contains said information message corresponding to said target object, maintains its position relative to the target object even if the target object is moved, is persistent until dismissed by the user, and enables continued interaction by the user with the target object while the notification object is being displayed, and
means for selectively switching the display of said notification object to a second, collapsed state having a reduced size relative to said first state.

17. The system of claim 16, wherein the notification object maintains its position relative to the target object in both its first and second states.

18. A graphical user interface element for providing a user with information regarding a computer application being executed, comprising a persistent, non-modal notification object containing an indication mechanism which forms part of said notification object and points to a target within said computer application with which the computer notification object is associated, wherein said notification object maintains its position relative to the target even if the target is moved, said user interface element being displayed in a first state that contains information relating to said target and being selectively switchable to a second, collapsed display state that omits at least some of said information.

19. The user interface element of claim 18, wherein said information comprises text information.

20. The user interface element of claim 18, further comprising an icon disposed within said notification object.

21. The user interface element of claim 20, wherein said icon comprises an on-screen button for receiving user interaction.

22. The user interface element of claim 21, wherein said user interface element is switched to said collapsed state in response to user interaction with said icon.

23. The user interface element of claim 18, wherein said indication mechanism comprises a cartouche.

24. The user interface element of claim 18, further comprising an audio for indicating the display of the notification object on a computer screen to a user.

25. The user interface element of claim 18, wherein said notification object is displayed with animation.

26. The user interface element of claim 18, wherein the notification object maintains its position relative to the target in both its first and second states.

27. A computer program stored in a computer-readable medium which executes the following steps:
receiving an action performed on a computer by a user;
determining if the received action requires generation of an information message;
selecting an information message to be generated corresponding to said action performed by the user;
locating a target object corresponding to the action performed by the user, to which the information contained within the notification message relates; and
displaying a notification object which indicates the target object and contains said information message corresponding to said target object, wherein said notification object maintains its position relative to the target object even if the target object is moved;
selectively displaying said notification object in a second, collapsed state having a reduced size relative to said first state;
wherein said displayed notification object is persistent until dismissed by the user; and
wherein said notification object is non-modal and enables the user to continue interaction with an application program corresponding to said target while said object is being displayed.

28. The method of claim 1, further comprising the step of:
receiving an action performed on a computer by a user;
wherein said step of determining is performed on the action received in said step of receiving.

29. The computer program of claim 27, wherein said notification object includes a control element, and is displayed in said collapsed state in response to user activation of said control element.

30. The computer program of claim 27, wherein the notification object maintains its position relative to the target object in both its first and second states.

* * * * *